(12) United States Patent
Podila et al.

(10) Patent No.: US 12,470,621 B2
(45) Date of Patent: Nov. 11, 2025

(54) TRANSPARENT LOAD BALANCING

(71) Applicant: VMware LLC, Palo Alto, CA (US)

(72) Inventors: Srinivasa Srikanth Podila, Bangalore (IN); Hiral Mehta, Bangalore (IN); Varun Lakkur Ambaji Rao, Bangalore (IN)

(73) Assignee: VMware LLC, Palo Alto, CA (US)

( * ) Notice: Subject to any disclaimer, the term of this patent is extended or adjusted under 35 U.S.C. 154(b) by 198 days.

(21) Appl. No.: 18/211,562

(22) Filed: Jun. 19, 2023

(65) Prior Publication Data

US 2024/0031428 A1    Jan. 25, 2024

(30) Foreign Application Priority Data

Jul. 22, 2022    (IN) .............................. 202241042037

(51) Int. Cl.
*H04L 67/1004*    (2022.01)
(52) U.S. Cl.
CPC ................................ *H04L 67/1004* (2013.01)
(58) Field of Classification Search
CPC ....................... H04L 67/1004; H04L 67/1001
See application file for complete search history.

(56) References Cited

U.S. PATENT DOCUMENTS

| | | | |
|---|---|---|---|
| 5,204,966 A | 4/1993 | Wittenberg et al. | |
| 5,900,025 A | 5/1999 | Sollars | |
| 6,108,308 A | 8/2000 | Flavin et al. | |
| 6,687,245 B2 | 2/2004 | Fangman et al. | |
| 7,120,693 B2 | 10/2006 | Chang et al. | |
| 7,146,421 B2 | 12/2006 | Syvanne | |
| 7,277,401 B2 | 10/2007 | Kyperountas et al. | |
| 7,290,050 B1 * | 10/2007 | Smith | H04L 67/1008 709/224 |
| 7,561,515 B2 | 7/2009 | Ross | |

(Continued)

FOREIGN PATENT DOCUMENTS

| | | |
|---|---|---|
| CN | 101641912 A | 2/2010 |
| CN | 103181131 A | 6/2013 |

(Continued)

OTHER PUBLICATIONS

Author Unknown, "Enabling Service Chaining on Cisco Nexus 1000V Series," Month Unknown, 2012, 25 pages, CISCO.

(Continued)

*Primary Examiner* — Benjamin M Thieu
(74) *Attorney, Agent, or Firm* — Quarles & Brady LLP

(57) ABSTRACT

Some embodiments provide a method of performing load balancing on client traffic sent to a cluster of servers that are associated with a common network address (e.g., for a VIP address associated with a service provided by the cluster of servers). The method assigns a cluster of two or more transparent load balancers to the common network address associated with the server cluster. The method configures at least two of these transparent load balancers as active transparent load balancers that concurrently (1) receive data message flows sent by clients directed to the common network address, (2) select one of the servers for each flow, and (3) forward each flow to the server selected for the flow without modifying a source network address (e.g., IP network address) of the flow.

20 Claims, 7 Drawing Sheets

(56) References Cited

U.S. PATENT DOCUMENTS

| | | | |
|---|---|---|---|
| 7,724,670 B2 | 5/2010 | Nilakantan et al. | |
| 7,760,640 B2 | 7/2010 | Brown et al. | |
| 7,765,312 B2 | 7/2010 | Monette et al. | |
| 7,778,194 B1 | 8/2010 | Yung | |
| 7,818,452 B2 | 10/2010 | Matthews et al. | |
| 7,826,390 B2 | 11/2010 | Noel et al. | |
| 7,881,215 B1 | 2/2011 | Daigle et al. | |
| 7,948,986 B1 | 5/2011 | Ghosh et al. | |
| 8,005,770 B2 | 8/2011 | Minh et al. | |
| 8,190,767 B1 | 5/2012 | Maufer et al. | |
| 8,244,864 B1 * | 8/2012 | Bahl | H04L 67/148 709/228 |
| 8,261,317 B2 | 9/2012 | Litvin et al. | |
| 8,300,532 B1 | 10/2012 | Venkatramani et al. | |
| 8,316,113 B2 | 11/2012 | Linden et al. | |
| 8,339,994 B2 | 12/2012 | Gnanasekaran et al. | |
| 8,369,323 B1 | 2/2013 | Desai | |
| 8,370,936 B2 | 2/2013 | Zuk et al. | |
| 8,553,552 B2 | 10/2013 | Hu et al. | |
| 8,625,426 B2 | 1/2014 | Strulo et al. | |
| 8,711,703 B2 | 4/2014 | Allan et al. | |
| 8,713,663 B2 | 4/2014 | An | |
| 8,737,221 B1 | 5/2014 | Jilani et al. | |
| 8,811,401 B2 | 8/2014 | Stroud et al. | |
| 8,830,834 B2 | 9/2014 | Sharma et al. | |
| 8,897,132 B2 | 11/2014 | Feroz et al. | |
| 8,937,865 B1 | 1/2015 | Kumar et al. | |
| 8,942,238 B2 | 1/2015 | Kano | |
| 8,958,293 B1 * | 2/2015 | Anderson | H04L 67/1001 370/230 |
| 9,110,864 B2 | 8/2015 | Jamjoom et al. | |
| 9,137,052 B2 | 9/2015 | Koponen et al. | |
| 9,166,988 B1 | 10/2015 | Shin et al. | |
| 9,231,871 B2 | 1/2016 | Mehta et al. | |
| 9,270,521 B2 | 2/2016 | Tompkins | |
| 9,282,027 B1 | 3/2016 | Brandwine et al. | |
| 9,317,469 B2 | 4/2016 | Gross et al. | |
| 9,349,135 B2 | 5/2016 | Sarshar | |
| 9,374,337 B2 | 6/2016 | Rangaraman et al. | |
| 9,391,859 B2 | 7/2016 | Huang et al. | |
| 9,401,818 B2 | 7/2016 | Venkatesh | |
| 9,450,862 B2 | 9/2016 | Chen et al. | |
| 9,497,281 B2 | 11/2016 | Jagadish et al. | |
| 9,825,810 B2 | 11/2017 | Jain et al. | |
| 9,866,473 B2 | 1/2018 | Parsa et al. | |
| 9,876,714 B2 | 1/2018 | Parsa et al. | |
| 10,044,617 B2 | 8/2018 | Parsa et al. | |
| 10,390,290 B1 | 8/2019 | Zhang et al. | |
| 10,951,584 B2 | 3/2021 | Kancherla et al. | |
| 11,153,122 B2 | 10/2021 | Dubey et al. | |
| 11,296,984 B2 | 4/2022 | Kancherla et al. | |
| 11,533,255 B2 | 12/2022 | Parsa et al. | |
| 11,570,092 B2 | 1/2023 | Kancherla et al. | |
| 2002/0078174 A1 * | 6/2002 | Sim | H04L 67/1008 709/219 |
| 2003/0093481 A1 | 5/2003 | Mitchell et al. | |
| 2003/0154399 A1 | 8/2003 | Zuk et al. | |
| 2004/0018839 A1 | 1/2004 | Andric et al. | |
| 2004/0071087 A1 * | 4/2004 | Siev | H04L 67/1006 370/235 |
| 2004/0197079 A1 | 10/2004 | Latvala et al. | |
| 2004/0268357 A1 * | 12/2004 | Joy | H04L 67/63 718/105 |
| 2005/0063324 A1 | 3/2005 | O'Neill et al. | |
| 2005/0220098 A1 | 10/2005 | Oguchi et al. | |
| 2006/0080446 A1 * | 4/2006 | Bahl | H04L 67/1001 709/227 |
| 2006/0176882 A1 | 8/2006 | Schein et al. | |
| 2006/0193247 A1 | 8/2006 | Naseh et al. | |
| 2006/0193252 A1 | 8/2006 | Naseh et al. | |
| 2007/0061492 A1 | 3/2007 | Riel | |
| 2007/0180226 A1 | 8/2007 | Schory et al. | |
| 2007/0201357 A1 | 8/2007 | Smethurst et al. | |
| 2008/0072305 A1 | 3/2008 | Casado et al. | |
| 2008/0098113 A1 | 4/2008 | Hansen et al. | |
| 2008/0259938 A1 | 10/2008 | Keene et al. | |
| 2009/0016354 A1 | 1/2009 | Isobe | |
| 2009/0097406 A1 | 4/2009 | Nilakantan et al. | |
| 2009/0129271 A1 | 5/2009 | Ramankutty et al. | |
| 2009/0193122 A1 | 7/2009 | Krishamurthy | |
| 2009/0199268 A1 | 8/2009 | Ahmavaara et al. | |
| 2009/0235325 A1 | 9/2009 | Dimitrakos et al. | |
| 2010/0046530 A1 | 2/2010 | Hautakorpi et al. | |
| 2010/0097931 A1 | 4/2010 | Mustafa | |
| 2010/0100616 A1 | 4/2010 | Bryson et al. | |
| 2010/0271964 A1 | 10/2010 | Akhter et al. | |
| 2010/0302940 A1 | 12/2010 | Patel et al. | |
| 2011/0013639 A1 | 1/2011 | Matthews et al. | |
| 2011/0026537 A1 | 2/2011 | Kolhi et al. | |
| 2011/0213888 A1 | 9/2011 | Goldman et al. | |
| 2012/0106560 A1 | 5/2012 | Gumaste | |
| 2012/0131216 A1 | 5/2012 | Jain et al. | |
| 2012/0216282 A1 | 8/2012 | Pappu et al. | |
| 2012/0250682 A1 | 10/2012 | Vincent et al. | |
| 2012/0258712 A1 | 10/2012 | Rozinov | |
| 2013/0007740 A1 | 1/2013 | Kikuchi et al. | |
| 2013/0073743 A1 | 3/2013 | Ramasamy et al. | |
| 2013/0121209 A1 | 5/2013 | Padmanabhan et al. | |
| 2013/0155902 A1 | 6/2013 | Feng et al. | |
| 2013/0163594 A1 | 6/2013 | Sharma et al. | |
| 2013/0174177 A1 | 7/2013 | Newton et al. | |
| 2013/0201989 A1 | 8/2013 | Hu et al. | |
| 2013/0204849 A1 * | 8/2013 | Chacko | G06F 3/0664 707/692 |
| 2013/0227550 A1 | 8/2013 | Weinstein et al. | |
| 2013/0239198 A1 | 9/2013 | Niemi et al. | |
| 2013/0254085 A1 | 9/2013 | Tanimoto et al. | |
| 2013/0329584 A1 | 12/2013 | Ghose et al. | |
| 2013/0332983 A1 | 12/2013 | Koorevaar et al. | |
| 2013/0336337 A1 | 12/2013 | Gopinath et al. | |
| 2014/0050091 A1 | 2/2014 | Biswas et al. | |
| 2014/0068602 A1 | 3/2014 | Gember et al. | |
| 2014/0092906 A1 | 4/2014 | Kandaswamy et al. | |
| 2014/0115578 A1 | 4/2014 | Cooper et al. | |
| 2014/0195666 A1 | 7/2014 | Dumitriu et al. | |
| 2014/0198649 A1 | 7/2014 | Jain et al. | |
| 2014/0269733 A1 | 9/2014 | Venkatesh | |
| 2014/0297964 A1 | 10/2014 | Nakase | |
| 2014/0301388 A1 | 10/2014 | Jagadish et al. | |
| 2014/0304399 A1 | 10/2014 | Chaudhary et al. | |
| 2014/0310418 A1 | 10/2014 | Sorenson, III et al. | |
| 2014/0323127 A1 | 10/2014 | Evans et al. | |
| 2014/0380087 A1 | 12/2014 | Jamjoom et al. | |
| 2015/0106420 A1 | 4/2015 | Warfield et al. | |
| 2015/0146539 A1 | 5/2015 | Mehta et al. | |
| 2015/0263899 A1 | 9/2015 | Tubaltsev et al. | |
| 2015/0281042 A1 | 10/2015 | Agarwal et al. | |
| 2015/0312155 A1 | 10/2015 | Anand et al. | |
| 2016/0006654 A1 | 1/2016 | Fernando et al. | |
| 2016/0028630 A1 | 1/2016 | Wells | |
| 2016/0028855 A1 | 1/2016 | Goyal et al. | |
| 2016/0043901 A1 | 2/2016 | Sankar et al. | |
| 2016/0065479 A1 | 3/2016 | Harper et al. | |
| 2016/0080261 A1 | 3/2016 | Koponen et al. | |
| 2016/0119229 A1 | 4/2016 | Zhou | |
| 2016/0119236 A1 | 4/2016 | DeCusatis et al. | |
| 2016/0142295 A1 | 5/2016 | Parsa et al. | |
| 2016/0142296 A1 | 5/2016 | Parsa et al. | |
| 2016/0142297 A1 | 5/2016 | Parsa et al. | |
| 2016/0142314 A1 | 5/2016 | Parsa et al. | |
| 2016/0226700 A1 | 8/2016 | Zhang et al. | |
| 2016/0241669 A1 | 8/2016 | Royon et al. | |
| 2016/0308770 A1 | 10/2016 | Zhang et al. | |
| 2016/0315814 A1 | 10/2016 | Thirumurthi et al. | |
| 2016/0350151 A1 | 12/2016 | Zou et al. | |
| 2017/0048136 A1 | 2/2017 | Williams | |
| 2017/0085486 A1 | 3/2017 | Chung et al. | |
| 2017/0126790 A1 * | 5/2017 | Mortsolf | H04L 45/38 |
| 2017/0150418 A1 | 5/2017 | Kim et al. | |
| 2017/0195169 A1 | 7/2017 | Mills et al. | |
| 2017/0257801 A1 | 9/2017 | Toth et al. | |
| 2018/0248805 A1 | 8/2018 | Kamat et al. | |
| 2018/0278541 A1 | 9/2018 | Wu et al. | |

(56) References Cited

U.S. PATENT DOCUMENTS

| | | |
|---|---|---|
| 2019/0021029 A1 | 1/2019 | Rydnell et al. |
| 2019/0036815 A1 | 1/2019 | Kancherla et al. |
| 2019/0036819 A1 | 1/2019 | Kancherla et al. |
| 2019/0036881 A1 | 1/2019 | Kancherla et al. |
| 2019/0260610 A1 | 8/2019 | Dubey et al. |
| 2020/0204603 A1 | 6/2020 | Upadhyaya et al. |
| 2020/0252449 A1* | 8/2020 | Wood .................. H04L 67/01 |
| 2021/0014733 A1 | 1/2021 | Soliman et al. |
| 2022/0103476 A1 | 3/2022 | Sun et al. |
| 2023/0124797 A1 | 4/2023 | Parsa et al. |
| 2023/0224240 A1 | 7/2023 | Wang et al. |
| 2023/0262022 A1 | 8/2023 | Wang et al. |

FOREIGN PATENT DOCUMENTS

| | | |
|---|---|---|
| CN | 103647656 A | 3/2014 |
| CN | 103701900 A | 4/2014 |
| CN | 103930882 A | 7/2014 |
| CN | 104022891 A | 9/2014 |
| CN | 104011687 B | 9/2017 |
| EP | 1890438 A1 | 2/2008 |
| WO | 2008095010 A1 | 8/2008 |
| WO | 2016076900 A1 | 5/2016 |

OTHER PUBLICATIONS

Aversa, Luis, et al., "Load Balancing a Cluster of Web Servers Using Distributed Packet Rewriting," Computer Science Department Technical Report, Jan. 6, 1999, 13 pages, Boston University, Boston, MA, USA.

Dixon, Colin, et al., "An End to the Middle," Proceedings of the 12th Conference on Hot Topics in Operating Systems, May 2009, 5 pages, USENIX Association, Berkeley, CA, USA.

Guichard, J., et al., "Network Service Chaining Problem Statement," Network Working Group, Jun. 13, 2013, 14 pages, Cisco Systems, Inc.

Harper, Matthew H., et al., U.S. Appl. No. 62/042,049, filed Aug. 26, 2014, 27 pages.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Jung, Younchan, et al., "Integrated Management of Network Address Translation, Mobility, and Security on the Blockchain Control Plane," Sensors 2020, Dec. 21, 2019, 14 pages, MDPI, retrieved from https://www.mdpi.com/1424-8220/20/1/69.

Koponen, Teemu, et al., "Network Virtualization in Multi-tenant Datacenters," Technical Report TR-2013-001E, Aug. 2013, 22 pages, VMware, Inc., Palo Alto, CA, USA.

Liu, Bing, et al., "CFN-dyncast: Load Balancing the Edges via the Network," 2021 IEEE Wireless Communications and Networking Conference Workshops, Mar. 20, 2021, 6 pages, IEEE, Nanjing, China.

Noferi, Alessandro, et al., "Deployment and configuration of MEC apps with Simu5G," ArXiv: 2109.12048v1, Sep. 24, 2021, 9 pages, Department of Information Engineering, University of Pisa, Pisa, Italy.

Schroeder, Trevor, et al., "Scalable Web Server Clustering Technologies," IEEE Network, vol. 14, No. 3, May 1, 2000, 8 pages, IEEE Service Center, New York, NY, USA.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

* cited by examiner

TRANSPARENT LOAD BALANCING

BACKGROUND

Elastic load balancers are modern solutions to accommodate high loads on servers. A load balancer has a client network in the front end and a server network in the backend. In the standard mode of operation, a virtual IP (VIP) address is created for an application running on the servers. The front-end clients use this VIP address to access the application, and the load balancers distribute the client packets that are sent to this VIP address among the backend servers.

A load balancer typically performs SNAT (source network address translation) operation on the traffic to replace the client machine IP addresses with its own IP so that the backend servers direct any response back to the load balancer to process. Under this approach, the load balancer cluster is scalable, i.e., any number of load balancers can be added as each load balancer is independently load balancing the traffic to the server cluster.

However, certain applications need to receive the IP address of the source client machine for better client insight. For such applications, load balancers keep the client IPs as the source IPs in the packets that they sent to the backend servers, so that these servers have the client IPs to process. However, identifying the client IP as the source of the traffic from the client will result in the response traffic from the server being sent to the default gateway instead of the load balancer that forwarded the client traffic. The default gateway will not know how to process the response traffic as it has no knowledge of the original traffic forwarded by the load balancer to the server. To address this, some prior solutions designate only one active load balancer that also serves as the default gateway. This prevents the load balancer cluster from scaling out as this scheme does not support more than one active load balancer.

BRIEF SUMMARY

Some embodiments provide a method of performing load balancing on client traffic sent to a cluster of servers that are associated with a common network address (e.g., for a VIP address associated with a service provided by the cluster of servers). The method assigns a cluster of two or more transparent load balancers to the common network address associated with the server cluster. The method configures at least two of these transparent load balancers as active transparent load balancers that concurrently (1) receive data message flows sent by clients directed to the common network address, (2) select one of the servers for each flow, and (3) forward each flow to the server selected for the flow without modifying a source network address (e.g., IP network address) of the flow. In some embodiments, the transparent load balancers do not modify the source network addresses for the flows that the load balancers forward to the servers because the servers need the source network addresses for operations that the servers perform for the forwarded data messages.

In some embodiments, the method assigns the cluster of transparent load balancers by deploying a cluster of load balancing machines and associating each of the load balancing machine with the common network address of the server cluster. The method also configures each active transparent load balancer to provide information to a default gateway regarding each flow processed by the active transparent load balancer. This flow information will allow the default gateway to forward to the active transparent load balancer responsive data messages that the servers send back to the clients for the flows that the active transparent load balancer forwarded to the servers.

In some embodiments, the servers forward responsive data messages to the default gateway as the servers identify the default gateway as being associated with the unmodified source IP addresses of the flows that are forwarded to the servers. The default gateway is another load balancer in some embodiments, while in other embodiments the default gateway performs no load balancing operation.

The method of some embodiments configures the active transparent load balancers to use the default gateway to forward session-establishing messages (e.g., three-way TCP handshake messages) for new flows to the servers, and configures the default gateway to forward responsive session-establishing messages from the servers to the active transparent load balancers. For instance, in some embodiments, the method configures the transparent active load balancers to initially use the default gateway to establish new sessions with the servers that they select for new flows, and configures the transparent active load balancers to forward subsequent data messages of the flows with established sessions directly to the servers without directing the subsequent data messages through the default gateway.

In some embodiments, the load-balancer cluster performs load-balancing operations for several server clusters, each of which is associated with a different common network address (e.g., a different VIP address). In some of these embodiments, different load balancers in the cluster can serve as default gateways for different server clusters (e.g., a first load balancer serves as a default gateway for a first server cluster, while a second load balancer serves as a default gateway for the second server cluster).

Similarly, in some of these embodiments, different sets of load balancers in the load balancer (LB) cluster serve as active transparent load balancers for different server clusters (e.g., second and third load balancers serve as active transparent load balancers for the first server cluster, while the first and third load balancers serve as active transparent load balancers for the second server cluster). Also, in some embodiments, when the load on the default gateway load balancer for a server cluster exceeds a particular threshold (e.g., for a duration of time), another LB cluster is deployed so that another default gateway can be assigned to the server cluster.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method of performing load balancing on client traffic sent to a cluster of servers that are associated with a common network address (e.g., for a VIP address associated with a service provided by the cluster of servers). The method assigns a cluster of two or more transparent load balancers to the common network address associated with the server cluster. The method configures at least two of these transparent load balancers as active transparent load balancers that concurrently (1) receive data message flows sent by clients directed to the common network address, (2) select one of the servers for each flow, and (3) forward each flow to the server selected for the flow without modifying a source network address (e.g., IP network address) of the flow. In some embodiments, the transparent load balancers do not modify the source network addresses for the flows that the load balancers forward to the servers because the servers need the source network addresses for operations that the servers perform for the forwarded data messages.

The method of some embodiments configures at least one load balancer in the load-balancer cluster as a default gateway for the server cluster. In other embodiments, the default gateway is not a load balancer. The method also configures each active transparent load balancer to provide information to the default gateway regarding each flow processed by the active transparent load balancer. This flow information will allow the default gateway to forward to the active transparent load balancer responsive data messages that the servers send back to the clients for the flows that the active transparent load balancer forwarded to the servers.

Figure 1:
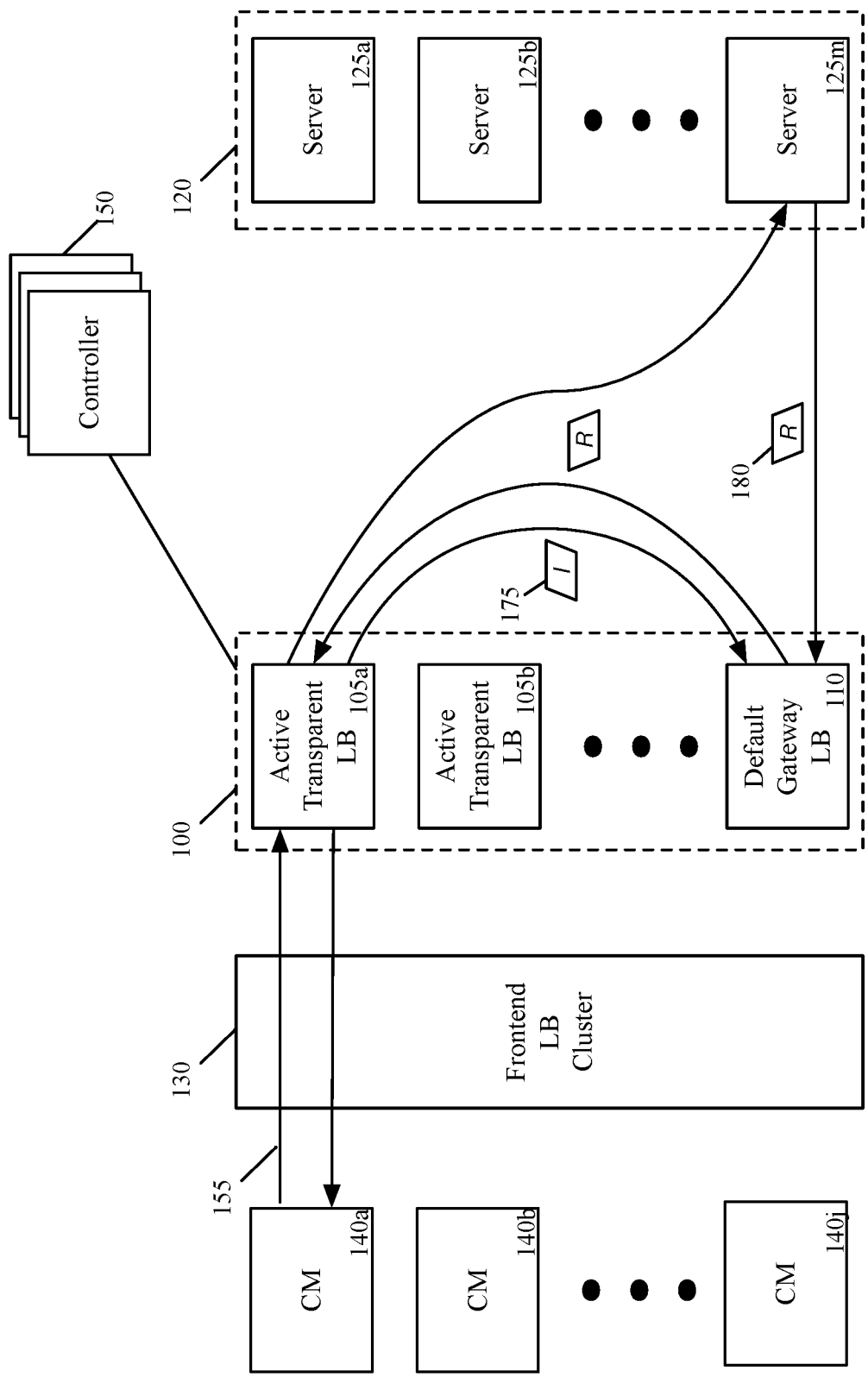
FIGS. 1-3 conceptually illustrate examples of an active transparent load balancer cluster that is configured according to the method of some embodiments.
Figure 2:
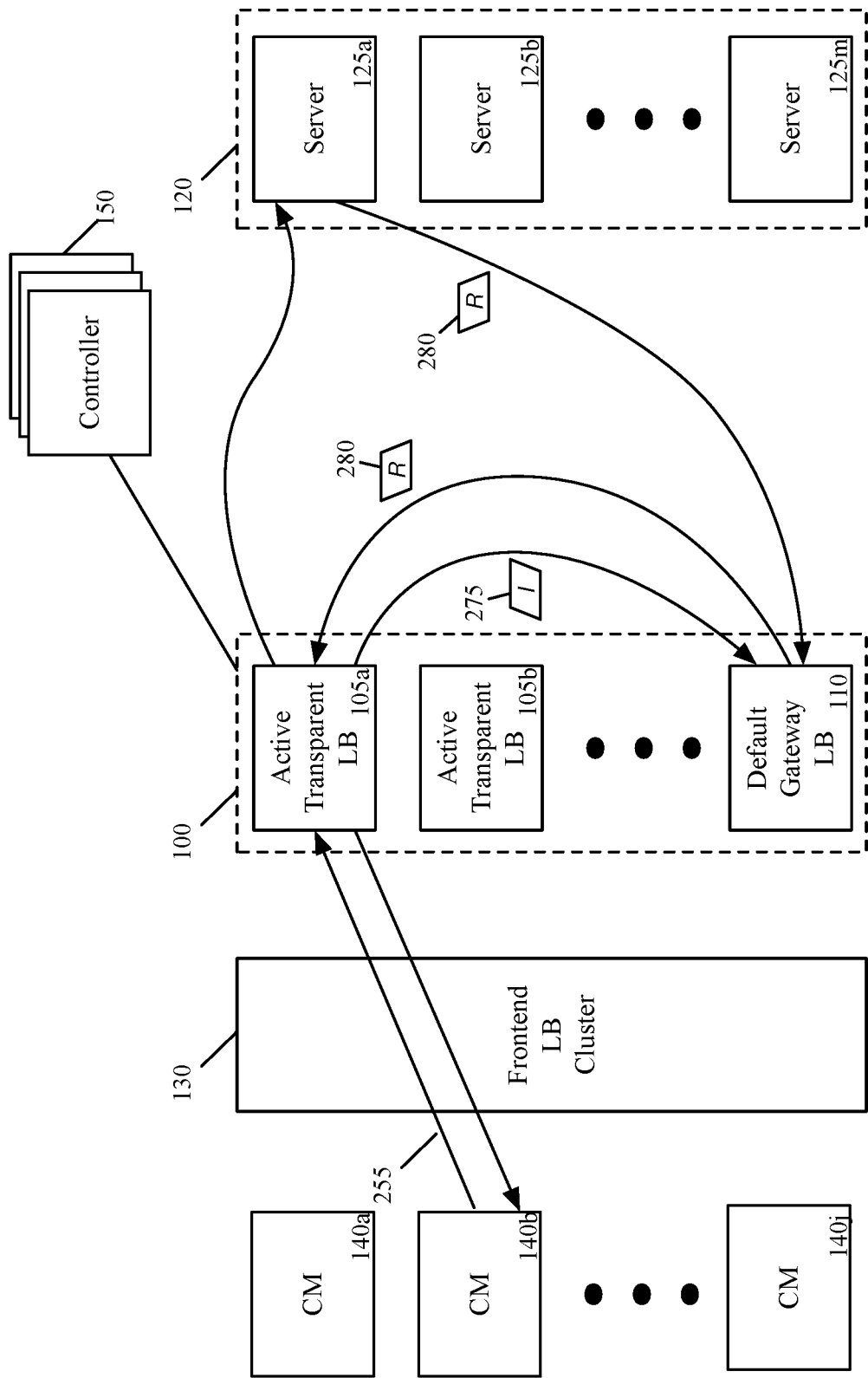
Figure 3:
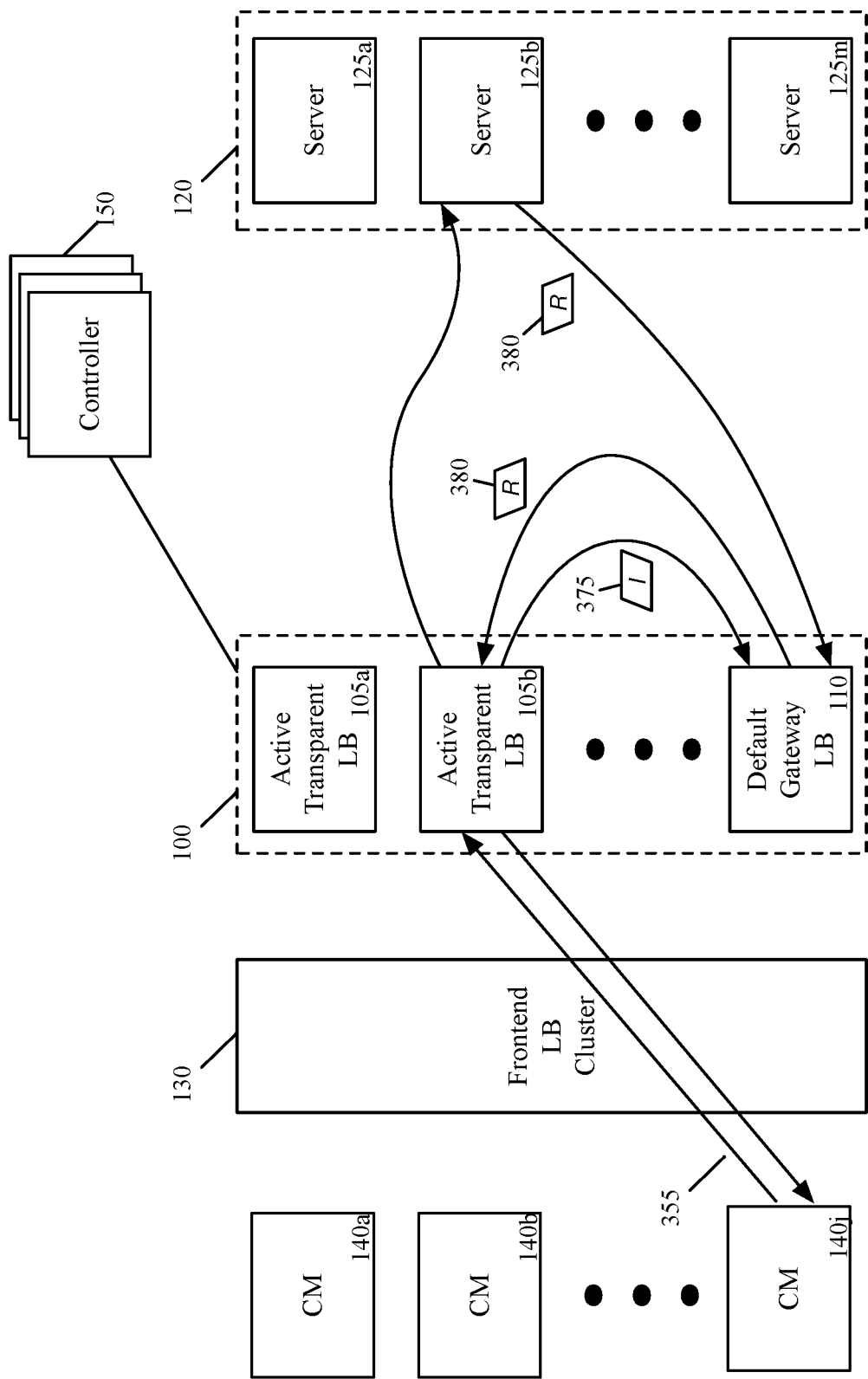

FIGS. 1-3 illustrate examples of an active transparent LB cluster 100 that is configured according to the method of some embodiments. As shown, the LB cluster includes N load balancers, with N−1 one of them being configured as active transparent load balancers 105 and one load balancer 110 being designated as a default gateway. In some embodiments, controller cluster 150 configures the load balancers 105 and 110 in the LB cluster.

In some embodiments, more than one load balancer in the cluster can be designated as a default gateway. For instance, in some embodiments, two or more load balancers in the cluster can be designated as two or more default gateways for two or more server clusters. Also, in some embodiments, different sets of load balancers in the LB cluster serve as active transparent load balancers for different server clusters. For instance, for the first server cluster in some embodiments, the first load balancer serves as a default gateway and the second and third load balancers serve as active transparent load balancers, while for the second server cluster, the first and third load balancers serve as active transparent load balancers and the second load balancer serves as a default gateway.

The examples presented in FIGS. 1-3 illustrate the load balancer cluster 100 distributing three different sets of flows from three client machines 140 among the servers 125 of a server cluster 120. As shown, a cluster 130 of one or more frontend load balancers distribute the different data message flows from the client machines 140 to the load balancers 105 of the LB cluster 100. In some embodiments, the client machines 140, frontend load balancer cluster 130, LB cluster 100 and the server cluster 120 are connected through one or more networks (not shown).

For instance, in some embodiments, all these components are connected through a local area network. In other embodiments, the LB cluster 100, the server cluster 120 and the frontend LB cluster 130 are part of one LAN, while the client machines 140 operate outside of the LAN and connect to the LAN through another network (e.g., the Internet, an MPLS network, or an SD-WAN network). In still other embodiments, the client machines 140, the LB cluster 100 and the server cluster all operate in different networks (e.g., operate in three or more separate networks connected though the Internet), with the frontend LB cluster 130 operating in the same network as the client machines 140 or the LB cluster 100 or in a different network than the networks of the client machines 140 and the LB cluster 100.

FIG. 1 illustrates the active transparent load balancer 105a (1) receiving a data message flow 155 sent by a client machine 140a directed to a common VIP address of the server cluster 120, (2) selecting the server 125m for this flow, and (3) forwarding the flow 155 to the selected server 125m without modifying the flow's source IP address, which is the IP address of the client machine 140a. The transparent load balancers 105 do not modify the source IP addresses for the flows that these load balancers forward to the servers because the servers need the source IP addresses for operations that the servers perform for the forwarded data messages.

The servers 125 of the server cluster 120 all perform a common set of operations. Hence, any request from any client machine 140 can be directed by the LB cluster 100 to any server 125 in the server cluster 120. For instance, in some embodiments, the servers 125 of the server cluster 120 perform middlebox service operations, while in other embodiments these servers perform compute operations (e.g., webserver operations, appserver operations, database server operations, etc.).

FIG. 1 also shows the active transparent load balancer 105a providing information 175 to the default gateway 110 regarding the flow 155 forwarded to server 125m. This flow information will allow the default gateway 110 to forward to the active transparent load balancer 105a responsive data messages 180 that the server 125m sends back to the client machine 140a for the flow that the active transparent load balancer 105a forwarded to the server 125m. This information includes session-establishing information in some embodiments.

For instance, before forwarding the flow 155 to the servers 125m, the active transparent load balancer 105a establishes the session for the flow forwarded to the server 125m by passing the sessions-establishing messages through the default gateway 110. In some embodiments, the active transparent load balancer 105a provides the flow information to the default gateway 110 by tunnelling the original session-establishing message (e.g., the SYN message in a three-way TCP handshake) to the default gateway 110 with flow-state information in an encapsulated tunnel header.

As part of this connection-session establishment, the default gateway 110 will have information regarding the flow 155. This flow information will allow the default gateway 110 to forward to the active transparent load balancer 105a responsive data messages that the server 125m sends back to the client machine 140a for the flow 155. Establishing the connection session through the default gateway will be further described by reference to FIG. 4.

FIG. 2 illustrates the active transparent load balancer 105a (1) receiving a data message flow 255 sent by a client machine 140b directed to the common VIP address of the server cluster 120, (2) selecting the server 125a for this flow, and (3) forwarding the flow to the selected server 125a without modifying the flow's source IP address. FIG. 3 illustrates the active transparent load balancer 105b (1) receiving a data message flow 355 sent by a client machine 140j directed to a common VIP address of the server cluster 120, (2) selecting the server 125b for this flow, and (3) forwarding the flow to the selected server 125b without modifying the flow's source IP address.

Before forwarding the flows 255 and 355 to the servers 125a and 125b, the active transparent load balancers 105a and 105b in both FIGS. 2 and 3 first establish connection-sessions for these flows with the servers 125a and 125b through the default gateway 110, and as part of this connection-session establishment, provide to the default gateway 110 information 275 and 375 regarding these respective flows 255 and 355. This flow information 275 and 375 will allow the default gateway 110 to forward to the active transparent load balancer 105a and 105b responsive data messages 280 and 380 that the server 125a and 125b send back to the client machine 140b and 140j for the flows 255 and 355.

Figure 4:
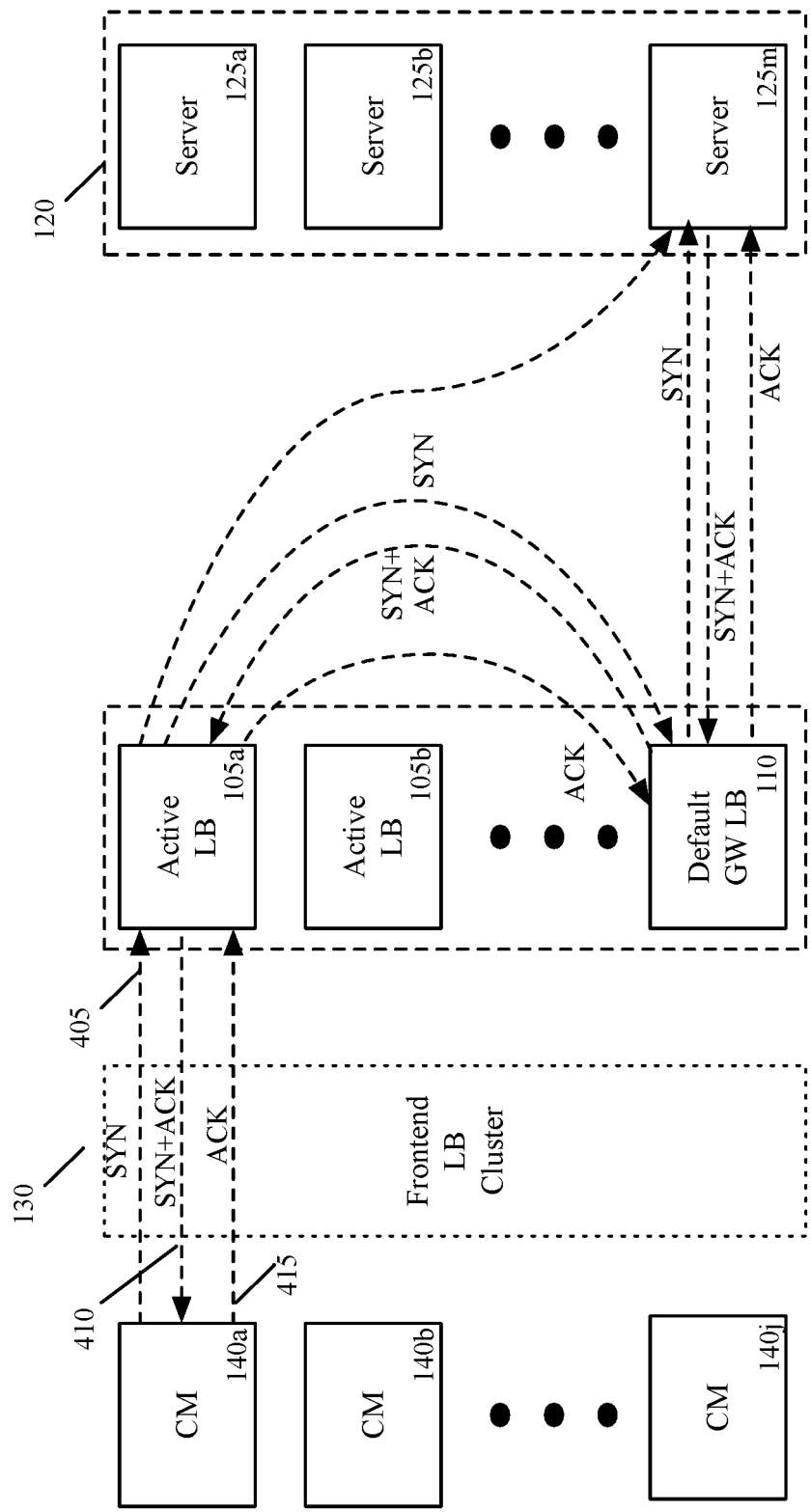
FIG. 4 conceptually illustrates an example of how an active transparent load balancer forwards flow information for a new flow to the default gateway in some embodiments.

FIG. 4 illustrates an example of how an active transparent load balancer 105a forwards flow information for a new flow to the default gateway 110 as part of a process in which it uses the default gateway to set up a connection session for the new flow with the server. Specifically, this figure shows the active transparent load balancer 105a establishing the session for the flow 155 forwarded to the server 125m by exchanging the initial sessions-establishing messages with the server 125m through the default gateway 110.

The session-establishing messages in this example are three-way TCP handshake messages for the flow 155, which include (1) a SYN message 405 from the load balancer 105a to the server 125m through the default gateway 110, (2) a SYN-ACK message 410 from the server 125m to the load balancer 105a through the default gateway 110, and (3) an ACK message 415 from the load balancer 105a to the server 125m through the default gateway 110.

From the perspective of the server 125m in some embodiments, the server operates as if the default gateway 110 is the originator of the three-way TCP handshake. Also, in some embodiments, the TCP session is between the client machine 140a and the server 125m, and the active transparent load balancer 105a simply passes along the three handshake messages to the server 125m and the client machine 140a.

In other embodiments, the active transparent load balancer 105a performs a soft-termination operation, in which it terminates a TCP connection with the client machine 140a and sets up a new TCP connection session with the server 125m, and passes data messages between the client machine 140a and the server 125m through these two separate sessions. Similarly, in some embodiments, the default gateway 110 simply passes along the three handshake messages between the server 125m and the active transparent load balancer 105a, while in other embodiments the default gateway 110 (1) performs a soft-termination operation to terminate a TCP connection with the active transparent load balancer 105a or the client machine 140a, and (2) sets up a new TCP connection session with the server 125m to pass data messages between the client machine 140a or active transparent load balancer 105a on one hand, and the server 125m on the other through these two separate sessions.

In some embodiments, the active transparent load balancer 105a provides the flow information to the default gateway 110 in the encapsulating header of the original SYN message 405 for the flow 155 to the default gateway 110 in the three-way TCP handshake illustrated in FIG. 4. Before sending the SYN message 405 of a particular flow, the active transparent load balancer 105a performs a load balancing operation (e.g., a weighted round robin selection that selects different servers based on weights assigned to the servers) to select the server 125m of the server cluster 120 that is to process the flow.

In some embodiments, the active transparent load balancer 105a and the default gateway 110 exchange the subsequent SYN-ACK and ACK messages for the flow 155 through tunnel encapsulated messages that they exchange with each other. Also, the default gateway 110 uses tunnel encapsulated messages to forward to the active transparent load balancer 105a data messages that it receives from the server 125m for the client machine 140a (i.e., encapsulates the received data messages with encapsulating tunnel headers that are addressed to the active transparent load balancer 105a). In some embodiments, the tunnel encapsulated data messages have an outer tunnel header that encapsulates the original header of the data messages and that allows the encapsulated data messages to traverse the underlay physical network.

In the examples illustrated in FIGS. 2 and 3, the active transparent load balancers 105a and 105b in some embodiments establish separate connection sessions for the flows 255 and 355 with the servers 125a and 125b through the default gateway 110. Hence, in these examples, the active transparent load balancers 105a and 105b in some embodiments exchange 3-way TCP handshake messages with the default gateway 110 through tunnel-encapsulated messages.

In other embodiments, however, each active transparent load balancer establishes only one connection session with the default gateway, and uses this session for exchanging all session-establishing messages as well as all server-responsive data messages for all the flows processed by the active transparent load balancer. Also, when the load-balancing cluster 100 has more than one default gateway, each active transparent load balancer provides to each default gateway information (e.g., through tunnel-encapsulated data messages) regarding the flows for which the active transparent load balancer uses the default gateway.

The load balancing architecture illustrated in FIGS. 1-4 has several advantages. For instance, the cluster of transparent load balancers can have two or more active load balancers, which allows the cluster to horizontally scale up or down to handle more or less load from client machines. Also, when the load on the default gateway load balancer for a server cluster exceeds a particular threshold (e.g., for a duration of time), another LB cluster can be deployed so that another default gateway can be assigned to the server cluster, e.g., to allow the previously used LB cluster with its default gateway to be used for other server cluster(s).

Figure 5A:
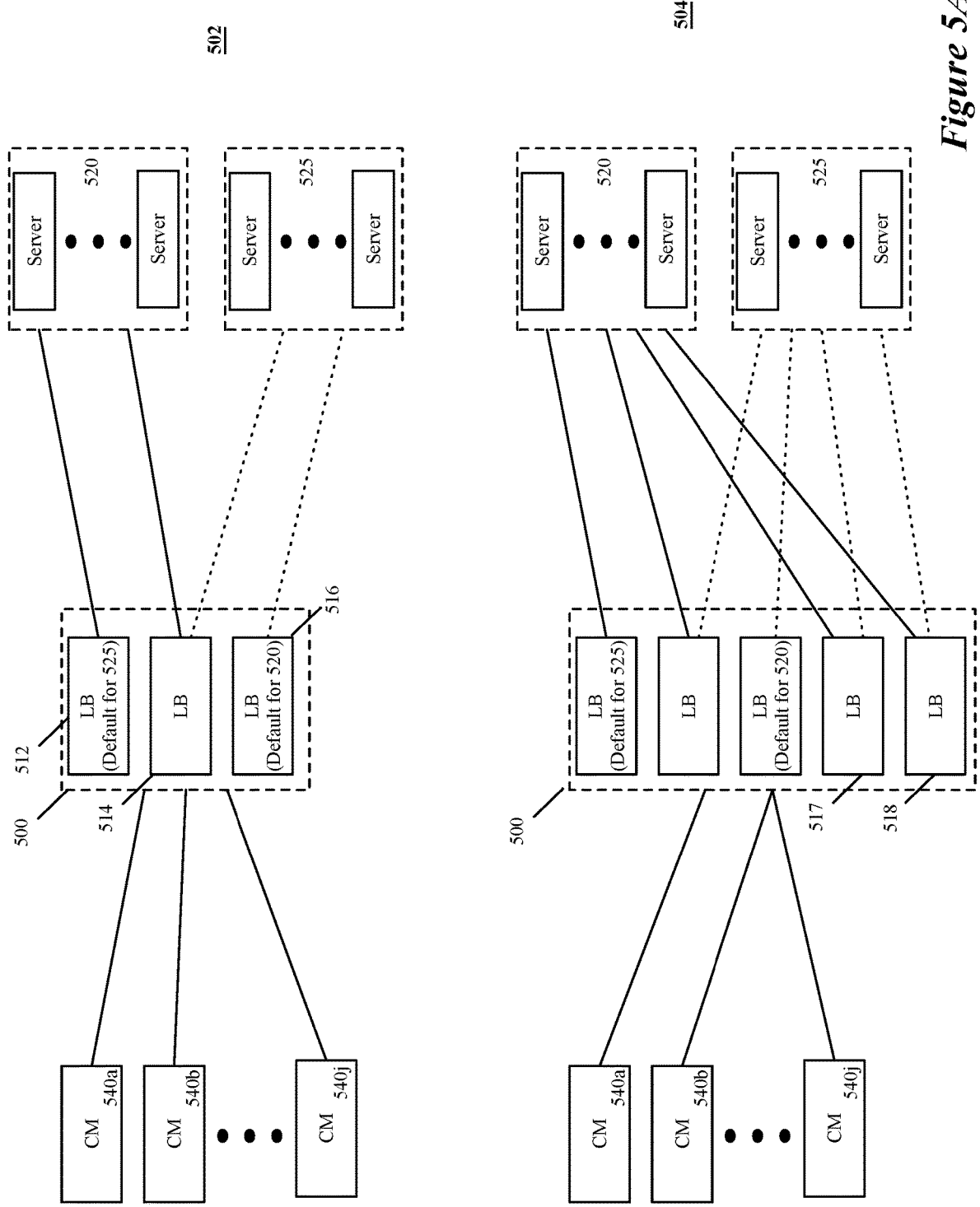
FIGS. 5A and 5B conceptually illustrate an example of a scale up process in some embodiments in three stages.
Figure 5B:
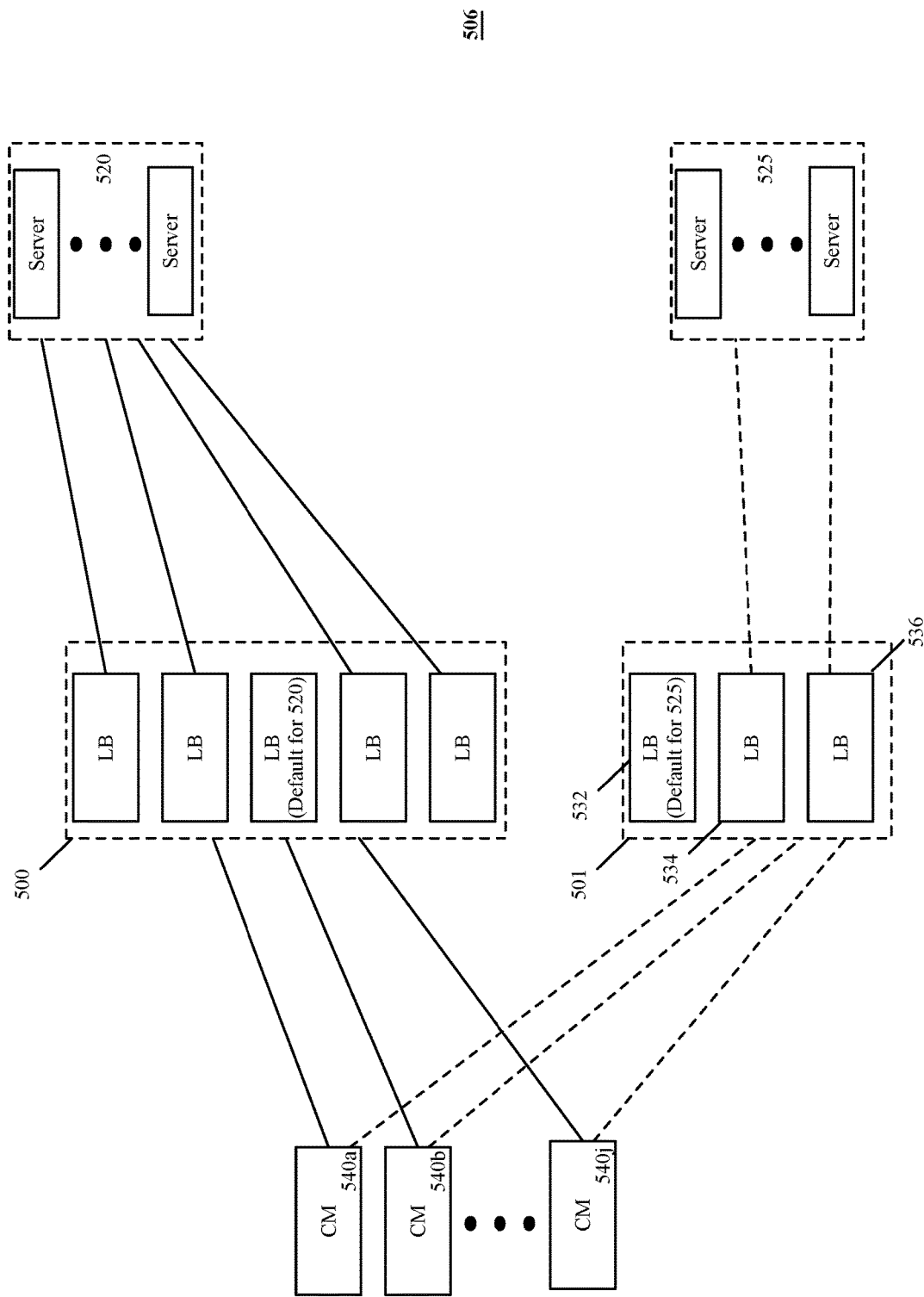

FIGS. 5A and 5B illustrate an example of this scale up process in some embodiments in three stages. The first stage 502 shows one LB cluster 500 distributing the load from several client machines 540 among the servers of two server clusters 520 and 525. Each server cluster provides a different service (middlebox or compute) for the client machines, and is associated with a different VIP address.

In the first stage, the LB cluster 500 has thee load balancers, with the first and second load balancers 512 and 514 being active load balancers for the first server cluster 520 and the second and third load balancers 514 and 516 being active load balancers for the second server cluster 525. In this example, the third load balancer 516 is the default gateway for the first server cluster 520 and the first load balancer 512 is the default gateway for the second server cluster 525.

The second stage 504 shows the addition of two additional load balancers 517 and 518 to the LB cluster. Both of these are active load balancers for the first and second server clusters 520 and 525. These two load balancers 517 and 518 were added a time period after the first stage in order to handle additional client load to the server clusters 520 and 525 (e.g., after the load on these two load balancers exceeded a first threshold value).

The third stage 506 then shows the creation of a second LB cluster 501, which has now been designated as the load balancer cluster for the second server cluster 525. In some embodiments, this second LB cluster 501 has been created as the load on the first LB cluster exceeded a second threshold for a duration of time. In this example, the first LB cluster 500 now only handles the first server cluster 520 (e.g., has been reconfigured by the controller not to perform load balancing operations for the second server cluster 525 and hence only performs load balancing operations for the first server cluster). Hence, the default gateway 532 and active transparent load balancers 534 and 536 for the second server cluster 525 are just in the second LB cluster 501.

In some embodiments, the controller 150 collects statistics from the load balancers, analyzes the collected statistics, and based on this analysis, adds and/or removes load balancers to a load balancing cluster, and/or adds and/or removes load balancer clusters to distribute the load-balancing load for two or more server clusters. The controller adds or removes load balancers or LB clusters by deploying or terminating load balancers in the datacenter. It also configures frontend load balancers 130 to use deployed LB clusters and configures the servers 125 with the route of their default gateways in some embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
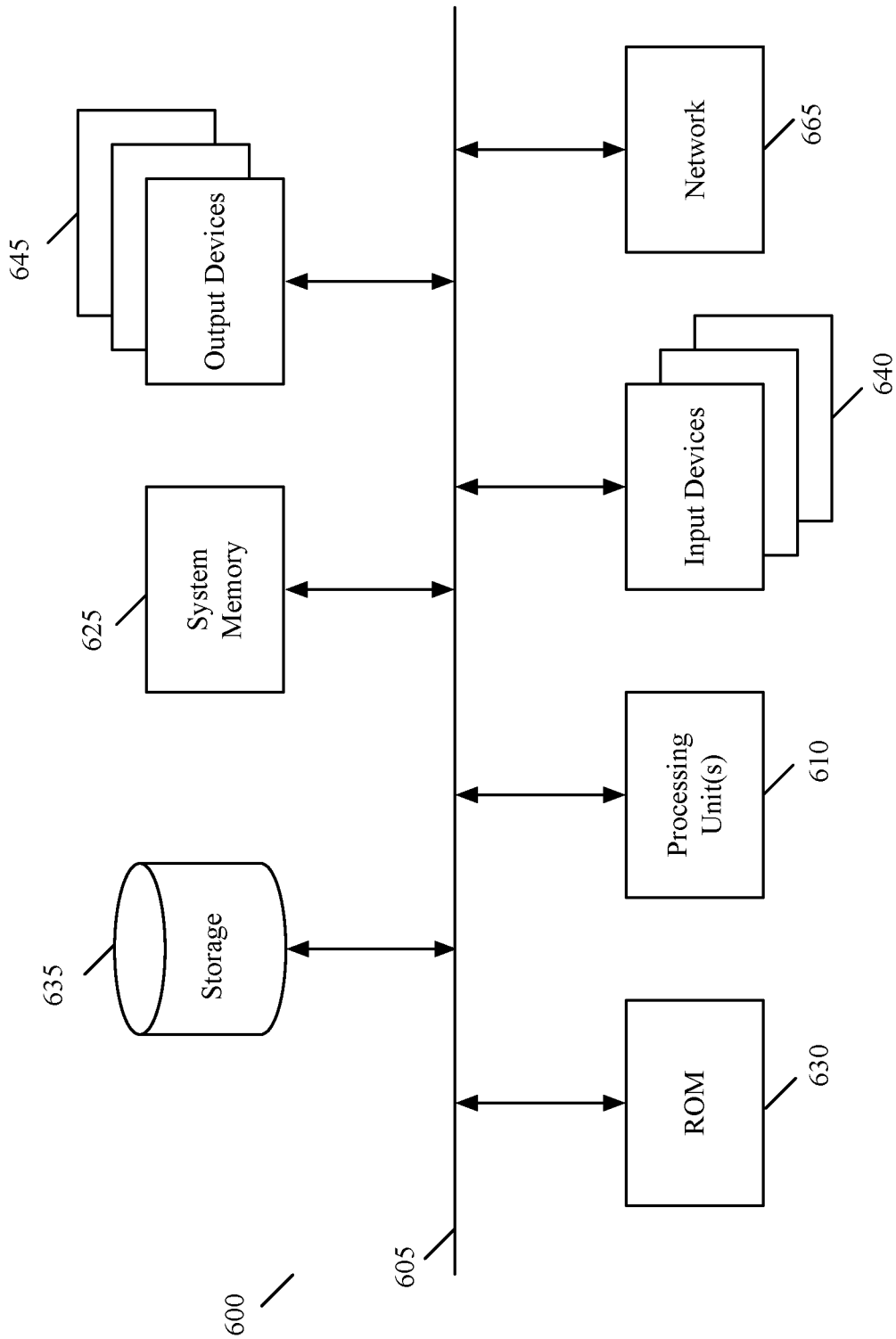
FIG. 6 conceptually illustrates a computer system with which some embodiments of the invention are implemented.

FIG. 6 conceptually illustrates a computer system 600 with which some embodiments of the invention are implemented. The computer system 600 can be used to implement any of the above-described computers and servers. As such, it can be used to execute any of the above described processes. This computer system includes various types of non-transitory machine readable media and interfaces for various other types of machine readable media. Computer system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the computer system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments. The read-only-memory (ROM) 630 stores static data and instructions that are needed by the processing unit(s) 610 and other modules of the computer system. The permanent storage device 635, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 635.

Other embodiments use a removable storage device (such as a flash drive, etc.) as the permanent storage device. Like the permanent storage device 635, the system memory 625 is a read-and-write memory device. However, unlike storage device 635, the system memory is a volatile read-and-write memory, such a random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the computer system. The input devices 640 include alphanumeric keyboards and pointing devices (also called "cursor control devices"). The output devices 645 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples computer system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of computer system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of performing load balancing for a plurality of servers, the method comprising:
   assigning a plurality of transparent load balancers to a common network address associated with the plurality of servers;
   configuring at least two of the transparent load balancers as active transparent load balancers that concurrently receive data message flows directed to the common network address, select one of the servers for each flow, and forward each flow to the server selected for the flow without modifying a source IP address of the flow;
   wherein different subsets of the plurality of transparent load balancers are configured to serve as active transparent load balancers and default gateways for different server clusters.

2. The method of claim 1, wherein the transparent load balancers do not modify the source IP addresses for the flows that the load balancers forward to the servers because the servers need the source IP addresses for operations that the servers perform for the forwarded data messages.

3. The method of claim 1, wherein assigning the plurality of transparent load balancers comprises deploying a cluster of load balancing machines and associating each load balancing machine with the common network address.

4. The method of claim 1 further comprising configuring one load balancer in the plurality of load balancers as a default gateway for the plurality of servers, said servers forwarding to the default gateway data messages that are responsive to the data messages that the active transparent load balancers forward to the servers.

5. The method of claim 4, wherein the servers forward responsive data messages to the default gateway load balancer as the servers identify the default gateway load balancer as being associated with the unmodified source IP addresses of the flows that are forwarded to the servers.

6. The method of claim 4 further comprising:
   configuring the active transparent load balancers to use the default gateway to forward session-establishing messages for new flows to the servers that they select for the new flows;
   configuring the default gateway to forward responsive session-establishing messages from the servers to the active transparent load balancers.

7. The method of claim 6, wherein the session-establishing messages are three-way TCP (Transmission Control Protocol) handshake messages.

8. The method of claim 4 further comprising configuring the transparent active load balancers to initially use the default gateway to establish new sessions with the servers that they select for new flows, and configuring the transparent active load balancers to forward subsequent data messages of the flows with established sessions directly to the servers without directing the subsequent data messages through the default gateway.

9. The method of claim 1 further comprising adding an additional transparent load balancers as active load balancers when a load on the two active transparent load balancers exceeds a threshold.

10. The method of claim 1, wherein the plurality of transparent load balancers are part of a first cluster of transparent load balancers assigned to a plurality of groups of servers, the method further comprising:
    adding a second cluster of transparent load balancers when a load on the first plurality of transparent load balancers exceeds a threshold; and
    configuring the second cluster of transparent load balancers to perform load balancing operations for a subset of the groups of servers.

11. A non-transitory machine readable medium storing a program which when executed by at least one processing unit performs load balancing for a plurality of servers, the program comprising sets of instructions for:
    assigning a plurality of transparent load balancers to a common network address associated with the plurality of servers;

configuring at least two of the transparent load balancers as active transparent load balancers that concurrently receive data message flows directed to the common network address, select one of the servers for each flow, and forward each flow to the server selected for the flow without modifying a source IP address of the flow;

wherein different subsets of the plurality of transparent load balancers are configured to serve as active transparent load balancers and default gateways for different server clusters.

12. The non-transitory machine readable medium of claim 11, wherein the transparent load balancers do not modify the source IP addresses for the flows that the load balancers forward to the servers because the servers need the source IP addresses for operations that the servers perform for the forwarded data messages.

13. The non-transitory machine readable medium of claim 11, wherein the set of instructions for assigning the plurality of transparent load balancers comprises a set of instructions for deploying a cluster of load balancing machines and associating each load balancing machine with the common network address.

14. The non-transitory machine readable medium of claim 11, wherein the program further comprises a set of instructions for configuring one load balancer in the plurality of load balancers as a default gateway for the plurality of servers, said servers forwarding to the default gateway data messages that are responsive to the data messages that the active transparent load balancers forward to the servers.

15. The non-transitory machine readable medium of claim 14, wherein the servers forward responsive data messages to the default gateway load balancer as the servers identify the default gateway load balancer as being associated with the unmodified source IP addresses of the flows that are forwarded to the servers.

16. The non-transitory machine readable medium of claim 14 further comprising sets of instructions for:

configuring the active transparent load balancers to use the default gateway to forward session-establishing messages for new flows to the servers that they select for the new flows;

configuring the default gateway to forward responsive session-establishing messages from the servers to the active transparent load balancers.

17. The non-transitory machine readable medium of claim 16, wherein the session-establishing messages are three-way TCP (Transmission Control Protocol) handshake messages.

18. The non-transitory machine readable medium of claim 14, wherein the program further comprises sets of instructions for configuring the transparent active load balancers to initially use the default gateway to establish new sessions with the servers that they select for new flows, and configuring the transparent active load balancers to forward subsequent data messages of the flows with established sessions directly to the servers without directing the subsequent data messages through the default gateway.

19. The non-transitory machine readable medium of claim 11, wherein the plurality of transparent load balancers are part of a first cluster of transparent load balancers assigned to a plurality of groups of servers, the program further comprising sets of instructions for:

adding a second cluster of transparent load balancers when a load on the first plurality of transparent load balancers exceeds a threshold; and configuring the second cluster of transparent load balancers to perform load balancing operations for a subset of the groups of servers.

20. The non-transitory machine readable medium of claim 19, wherein the program further comprises a set of instructions for reconfiguring the first cluster of transparent load balancers to no longer perform the load balancing operations for the subset of the groups of servers.

* * * * *